G. S. RAYMOND.
CONVERTIBLE SLIDING AND WHEELED RUNNING GEAR FOR VEHICLES.
APPLICATION FILED APR. 22, 1912.
1,060,123.
Patented Apr. 29, 1913.
2 SHEETS—SHEET 2.
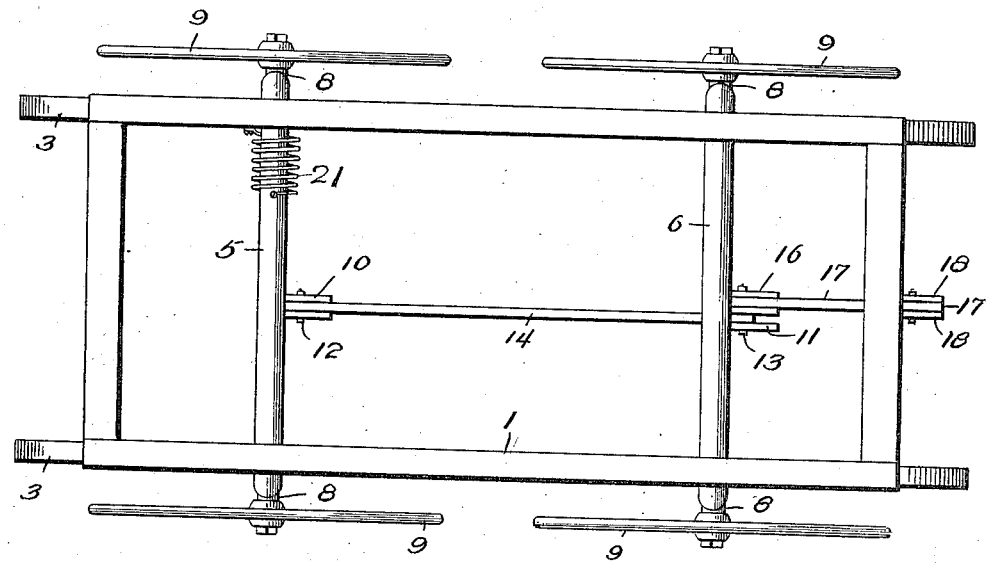
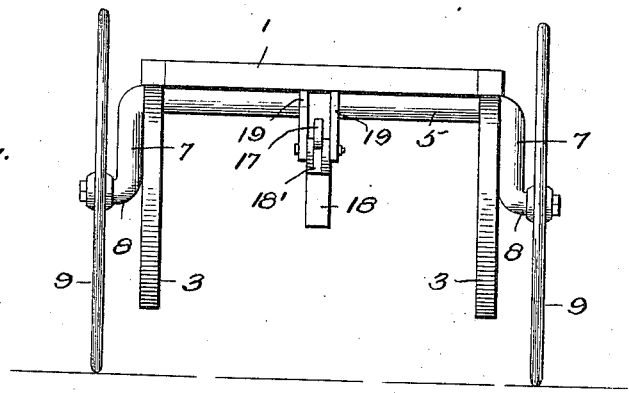
INVENTOR
George S. Raymond.
BY
Robert H. Young.
Attorney
WITNESSES

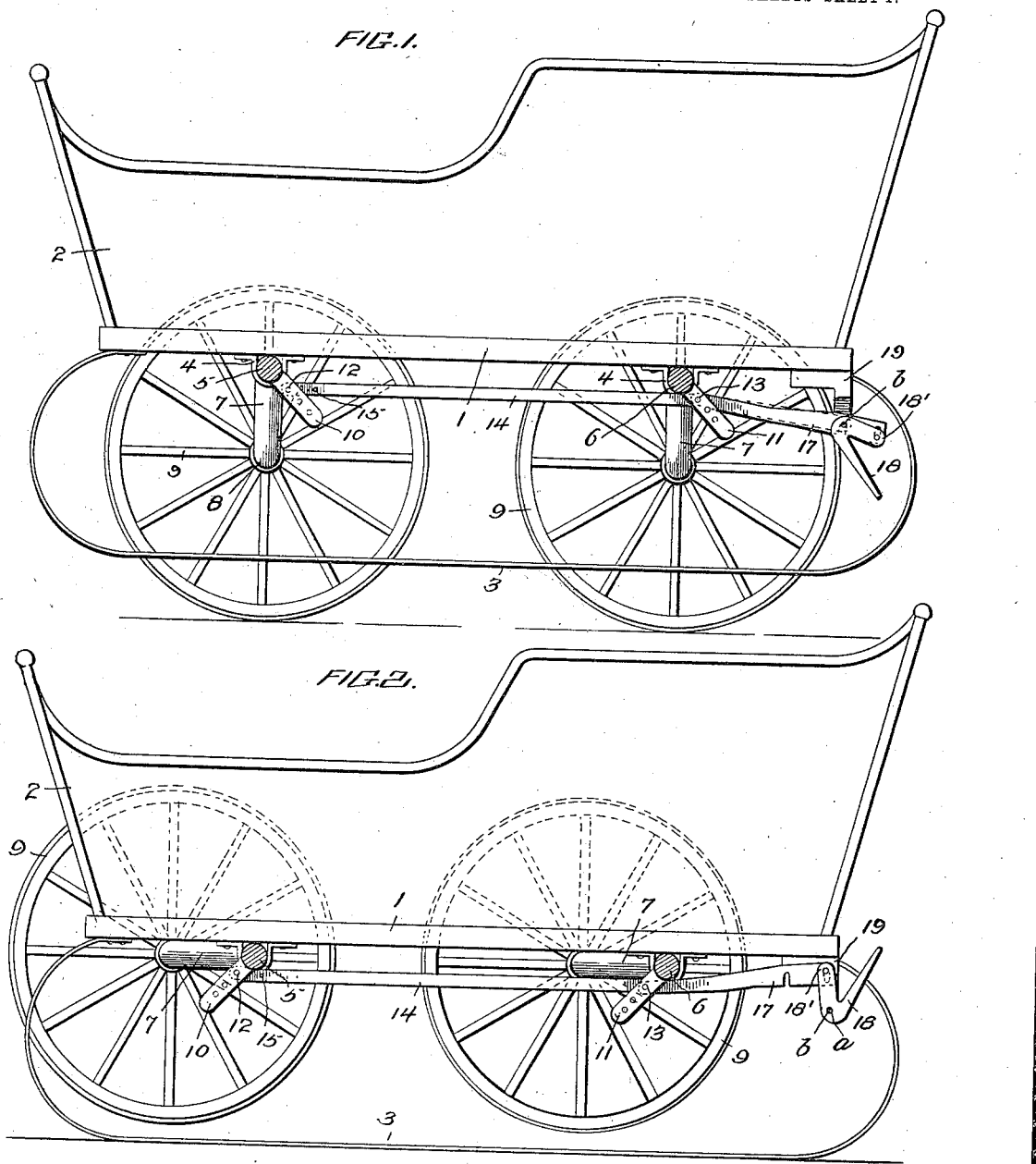

UNITED STATES PATENT OFFICE.

GEORGE S. RAYMOND, OF CHIPPEWA FALLS, WISCONSIN.

CONVERTIBLE SLIDING AND WHEELED RUNNING-GEAR FOR VEHICLES.

1,060,123. Specification of Letters Patent. Patented Apr. 29, 1913.

Application filed April 22, 1912. Serial No. 692,362.

*To all whom it may concern:*

Be it known that I, GEORGE S. RAYMOND, a citizen of the United States, residing at Chippewa Falls, in the county of Chippewa and State of Wisconsin, have invented new and useful Improvements in Convertible Sliding and Wheeled Running-Gears for Vehicles, of which the following is a specification.

My invention relates to convertible sliding and wheeled running gears for vehicles.

The object of my invention is to produce a running gear for vehicles, and particularly for children's vehicles, which may be alternated between wheels and sliding runners according to the condition of the ground.

A further object thereof is to produce convenient and efficient means for shifting the different running gear into and out of operation, and for holding the wheels thereof in convenient position when out of operation, and a still further object of my invention is to produce a more simple, cheap and efficient convertible and interchangeable running gear of said class than has heretofore been provided.

To these ends, my invention includes the combinations and arrangement of component parts to be hereinafter described and more particularly pointed out in the claim.

In the accompanying drawings, in which like reference characters indicate similar parts, Figure 1 is a side view of my invention with the wheels in operative position, Fig. 2 is a similar view showing the wheels shifted out of operative position and the sliding runners in position for use. Fig. 3 is an end view of my running gear; Fig. 4 is a top plan view of the same, and Fig. 5 is a detail view of my shifting rod.

Referring now to the drawings, 1 indicates a rectangular frame or bed of a vehicle upon which may be mounted a suitable body 2 as shown in Fig. 1. Upon said frame is rigidly secured the longitudinal runners 3 of suitable design, and adjacent to each end of the frame is loosely mounted in suitable bearings 4 the transverse wheel shafts 5 and 6. Each of said shafts is provided with a laterally disposed end portion 7 upon which is secured the wheel axles 8 and upon which the wheels 9 are mounted. Intermediate of their ends, each of said shafts is provided with a laterally projecting bifurcated arm 10 and 11 which are pierced transversely with a plurality of orifices, suitably spaced apart to accommodate bolts or pins 12 and 13 by which the pitman 14 is adjustably secured thereon to simultaneously rock said shafts as hereinafter described. Said pitman is provided, as shown with a plurality of orifices 15 adjacent to each end suitably spaced to register at different adjustments with the orifices in the lateral arms 10 and 11. The rear shaft 6 is also provided with an additional arm 16 paralleling the arm 11 and pierced to register with the orifices therein to secure one end of the rod 17 as illustrated in the drawings. The opposite end of said rod is provided with a vertically disposed transverse slot 17' by which it is secured upon one end of the bell-crank lever 18 which I will now proceed to describe.

Upon the lower face of the rear of the frame 1 is mounted the bifurcated bracket 19 between the members of which is pivotally mounted the bell-crank 18, the inner end of which 18' is bifurcated and transversely pierced at *a* to receive the pin *b* by which the rod 17 is secured thereto. Said bell-crank lever is pierced intermediate of its ends to accommodate the bolt 20 mounted on the bracket 19 upon which the lever is fulcrumed, and the outer or free end 18'' projects beyond the bracket 19 for convenient operation to shift the wheeled running gear, as hereinafter described.

Upon the front shaft 5, and fastened at one end thereto and at the opposite end to the frame 1 is secured the coil spring 21 adapted to normally hold the wheeled running gear out of operation as shown in Fig. 2 of the drawings.

It will be apparent, from the foregoing description and by reference to the accompanying drawings, that the convertible sliding and wheeled running gear comprising my invention herein shown and described, may be conveniently shifted into alternate use by the operation of the bell-crank lever 18. The fixed runners remain in rigid position, and the wheels mounted on the laterally disposed shafts 5 and 6 are when shifted into operation, forced from their normally inoperative position in which they are held by the spring 21, by the rocking of the lever 18 which actuates the rod 17 to shift the rear shaft 6 into operative position, which is communicated to the companion shaft 5 by the pitman 14, and when thus positioned they are held therein by the position assumed by the bell-crank lever and the rod 17, which parts after passing beyond a dead-center lock against each other in the position shown in Fig. 1 of the drawings, and cannot be forced out of position without shifting the position of the lever by the outer free end. It will furthermore be appreciated the parts and combinations of my invention thus described may be varied within a wide range without departing from the spirit and scope thereof.

Having thus described my invention, what I claim as new and desire to be secured by Letters Patent, is,

The combination with a vehicle frame and a pair of longitudinal sled runners rigidly mounted thereon, of a pair of transverse wheel shafts loosely mounted thereon and having laterally disposed end portions, wheels mounted on said shafts, laterally projecting arms on said shafts intermediate of their ends, a pitman connecting said arms, means for normally holding said running gear out of operative position, a rod coupled at one end with the projecting arm on the rear shaft and provided with a transverse notch intermediate its ends for shifting said wheeled running gear into and out of operative position, a rocking bell crank lever mounted on said vehicle frame and coupled at its lifting end in a transverse slot in and adjacent to the outer end of said rod adapted to operate the rod to shift the wheels and lock with the rod to hold the wheels in operative position, substantially as described.

GEORGE S. RAYMOND.

Witnesses:
DAYTON E. COOK,
BERT DE MARCE.

Copies of this patent may be obtained for five cents each, by addressing the "Commissioner of Patents, Washington, D. C."